Sept. 21, 1954 H. A. MAYO, SR 2,689,459
CREST CONTROL GATE FOR DAMS
Filed Feb. 29, 1952 4 Sheets-Sheet 1
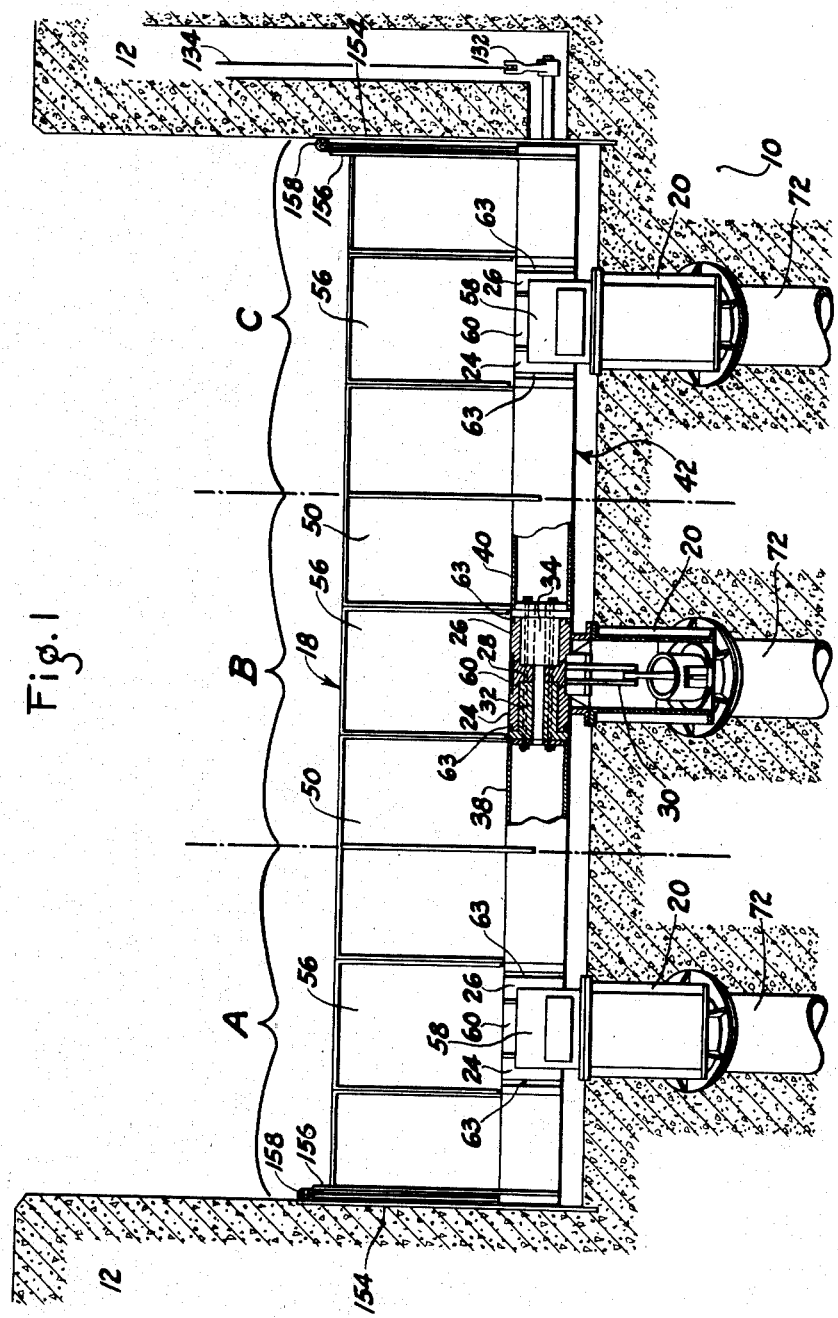
INVENTOR.
HOWARD A. MAYO, SR.
BY
ATTORNEY Sept. 21, 1954
H. A. MAYO, SR
2,689,459
CREST CONTROL GATE FOR DAMS
Filed Feb. 29, 1952
4 Sheets-Sheet 2
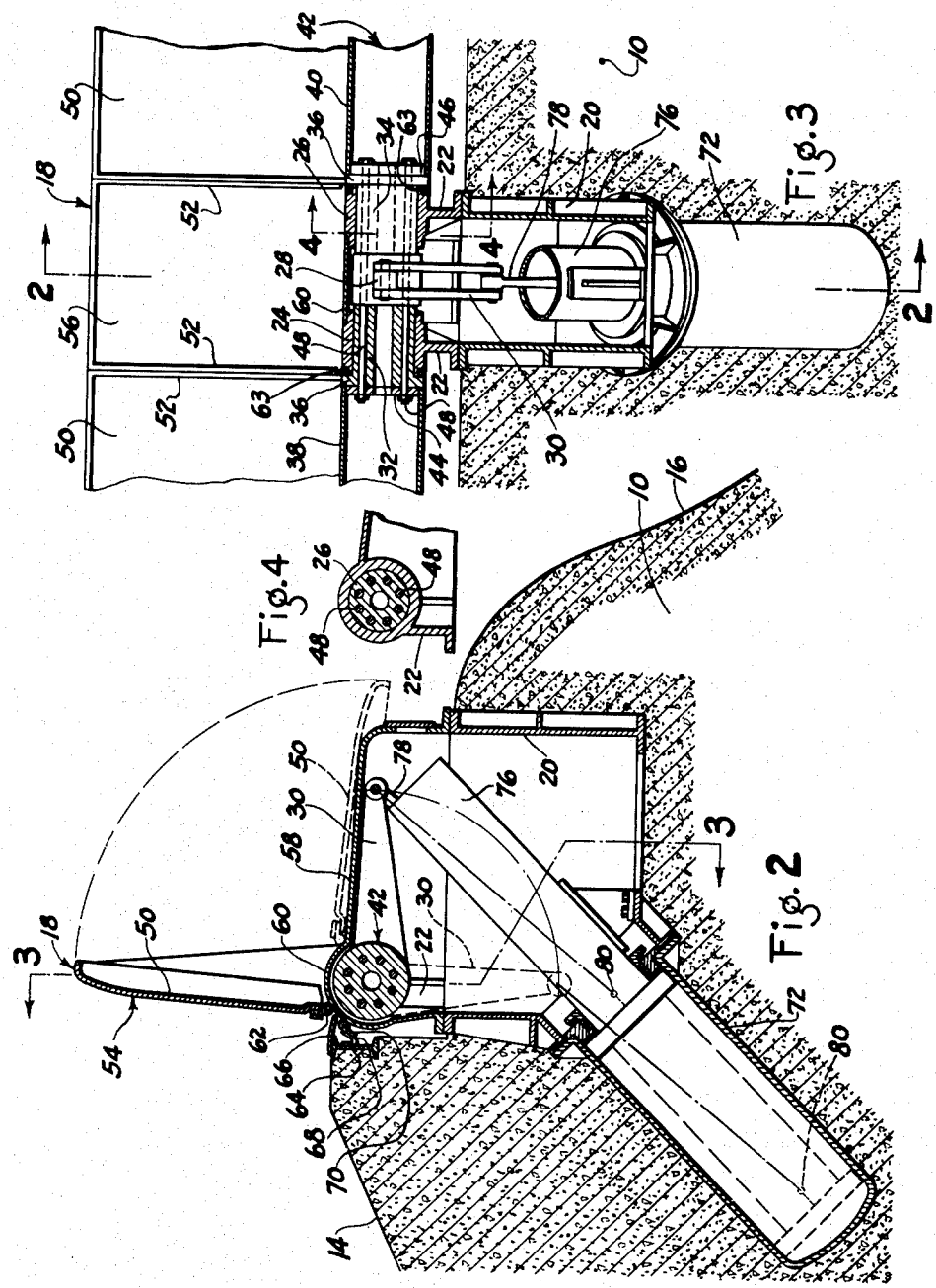
INVENTOR.
HOWARD A. MAYO, SR.
ATTORNEY

INVENTOR.
HOWARD A. MAYO, SR.
BY
ATTORNEY

Sept. 21, 1954     H. A. MAYO, SR     2,689,459
CREST CONTROL GATE FOR DAMS
Filed Feb. 29, 1952     4 Sheets-Sheet 4

INVENTOR
HOWARD A. MAYO, SR.

BY
ATTORNEY

Patented Sept. 21, 1954

2,689,459

UNITED STATES PATENT OFFICE 2,689,459

CREST CONTROL GATE FOR DAMS

Howard A. Mayo, Sr., Bolton, Mass., assignor to S. Morgan Smith Company, York, Pa., a corporation of Pennsylvania Application February 29, 1952, Serial No. 274,212

19 Claims. (Cl. 61—26)

1

This invention relates to improvements in dams and more particularly to improvements in means for adjusting the elevation of the crest of dams. It is advantageous to maintain a maximum elevation of water upstream of the dam, thus providing a large volume of water and a high head for pressure. In many instances it is decidedly advantageous, sometimes even necessary, to limit the maximum elevation of headwater in order to set a definite boundary to the area which is covered by water in time of flood or excess flow.

The present invention provides means which are operable automatically to increase the spillway areas of dams to discharge flood water, or unusually large run-offs, thus making it possible to limit the maximum height of water which will be attained. The use of the equipment comprising this invention makes it possible to have normal headwater at maximum elevation and at the same time to limit the area flooded in periods of high flow.

Situations also occur where it is desired to increase the height of an existing dam for purposes of providing a greater headwater level so as to furnish greater storage and/or power potential. An example would be where it is desired to increase the output of a hydroelectric plant.

Various expedients have been resorted to in the past to raise the headwater level of streams under the foregoing circumstances as well as others. One of these has consisted of the use of posts such as metal pipes inserted vertically into the crest of a dam and planking is arranged against said posts to form a wall or fence so as to raise the crest level of the dam. Because of inability to vary the height of the planking at will, accurate control of the headwater level is not possible. Also such means is usually not very durable or permanent and in situations such as when flooding occurs or ice jams or excessive floating debris accumulate against the planking, the posts are broken or bent and free the planking which is washed over the spillway face of the dam and usually becomes lost. Control of the headwater level is also lost. However, because this sort of arrangement is not unduly expensive to install, it is frequently used, especially on small dams, under circumstances where it is desired to increase the headwater. Nevertheless, installation is difficult and frequently dangerous to personnel, and numerous losses and replacement of the planking and posts will soon result in such installation being rather costly, as well as inefficient.

2

During relatively recent years a more refined type of structure has been used for the aforementioned purposes. Such structure comprises the mounting of a cantilever type gate on the crest of a dam, said gate being pivotally mounted so that it may be maintained either at or between the extremes of a substantially vertical damming position and a substantially horizontal discharge position, as desired, to maintain a suitable headwater level or pressure.

Operating means provided for such gate has usually been of such nature that the gate may be moved to and maintained in various intermediate positions between the aforementioned extreme positions. One type of gate of this nature, which is sometimes referred to in the industry as a "Bascule" gate, is illustrated in prior patent No. 2,192,510 to Smith, dated March 5, 1940, and assigned to the assignee of the present application. In this patent there is illustrated a gate which is pivotally mounted relative to the crest of a dam and means for operating the gate are positioned at opposite ends of each gate in piers extending substantially above the level of the crest. For a relatively short dam, one pier is provided at each end of the dam and a power actuated mechanism of a hydraulic nature is incorporated in each pier to operate a single gate extending between said piers.

For dams of extensive length, a number of additional intermediate piers are also placed usually at regularly spaced intervals across the crest of the dam. A gate is mounted on the crest between each successive pair of piers. Power actuated means are embodied in each of these intermediate piers as well as in the end piers of the dam, whereby each gate is actuated by means at both ends thereof. It has been found from practice that these piers are not only costly to install but they also offer consider obstruction to the passage of water over the gate and spillway face or apron of the dam. The piers also offer substantial obstruction to the passage of debris and floating ice, for example, over the crest provided by the gate or gates. In addition to the expense of constructing such intermediate piers and the power actuated means therein, the esthetic appearance of the dam also is affected adversely, in addition to the impedence offered by the intermediate piers to the passage of water and debris over the gate.

It is the principal object of the present invention to provide a gate pivotally mounted on the crest of a dam for purposes of controlling the head water level of either new or existing dams and novel operating and supporting means are also provided which are positioned preferably within the crest portion of the dam below the headwater level, thereby eliminating the need, particularly in dams of extensive length, for intermediate piers which were heretofore required in applying gates of this nature to relatively long dams in accordance with the principles of the aforementioned patent.

Another object of the present invention is to provide a gate supporting main bearing structure which is more efficient than the previously used structures of this general nature such as described in the aforementioned patent. In the present invention, a single main bearing is arranged intermediate the ends of the gate to be used on a dam which is not of undue length and, regarding extensive dams requiring a plurality of connected gate sections, each gate section is supported by a main bearing and the gate section supported by each main bearing extends substantially equally in opposite lateral directions from each main bearing.

A further object of the present invention is to incorporate with each main bearing a power actuated unit which is closely associated with the bearing for purposes of actuating the section of gate supported by said bearing, and said power actuated member is positioned preferably within the crest portion of the dam below the head water level, thereby permitting the installation of an actually continuous and unobstructed gate extending across the top of a dam from one end to the other.

In general, it is the principal purpose of the present invention to provide a pivotally supported, continuous gate on the crest of a dam, said gate being unobstructed from one end of the dam to the other for purposes of raising the headwater level whereby a greater volume of water as well as debris or ice may pass over the top of the gate and down the spillway face or apron than in using the structure of the prior patent referred to above. The type of gate comprising the present invention is considerably less expensive to build and install than that disclosed in said prior patent. Not only is the efficiency of the dam greatly improved but the overall esthetic appearance of the dam is also enhanced as compared to a dam using a gate installation requiring intermediate, obstructing piers such as that described in the aforementioned patent. Using only one main bearing and a power actuated unit associated therewith positioned intermediately of the ends of each gate section also affords a more efficient and less expensive type of installation than was heretofore possible.

Details of the foregoing objects and of the invention, as well as other objects thereof, are set forth in the following specification and illustrated in the attached drawings comprising a part thereof.

In the drawings:

Fig. 1 is a spillway face view of an exemplary installation of gate embodying the principles of the present invention and positioned on the crest portion of an exemplary dam.

Fig. 2 is a vertical sectional view taken on the line 2—2 of Fig. 3 and showing part of the gate and a main bearing and power actuated means for operating the gate pivotally mounted on the crest portion of a fragmentary crest portion of a dam.

Fig. 3 is a vertical section taken on the line 3—3 of Fig. 2, this sectional view being at 90° to the sectional view shown in Fig. 2.

Fig. 4 is a sectional view taken on the line 4—4 of Fig. 3 and showing a fragmentary portion of the main bearing structure shown in Figs. 2 and 3.

Figure 5:
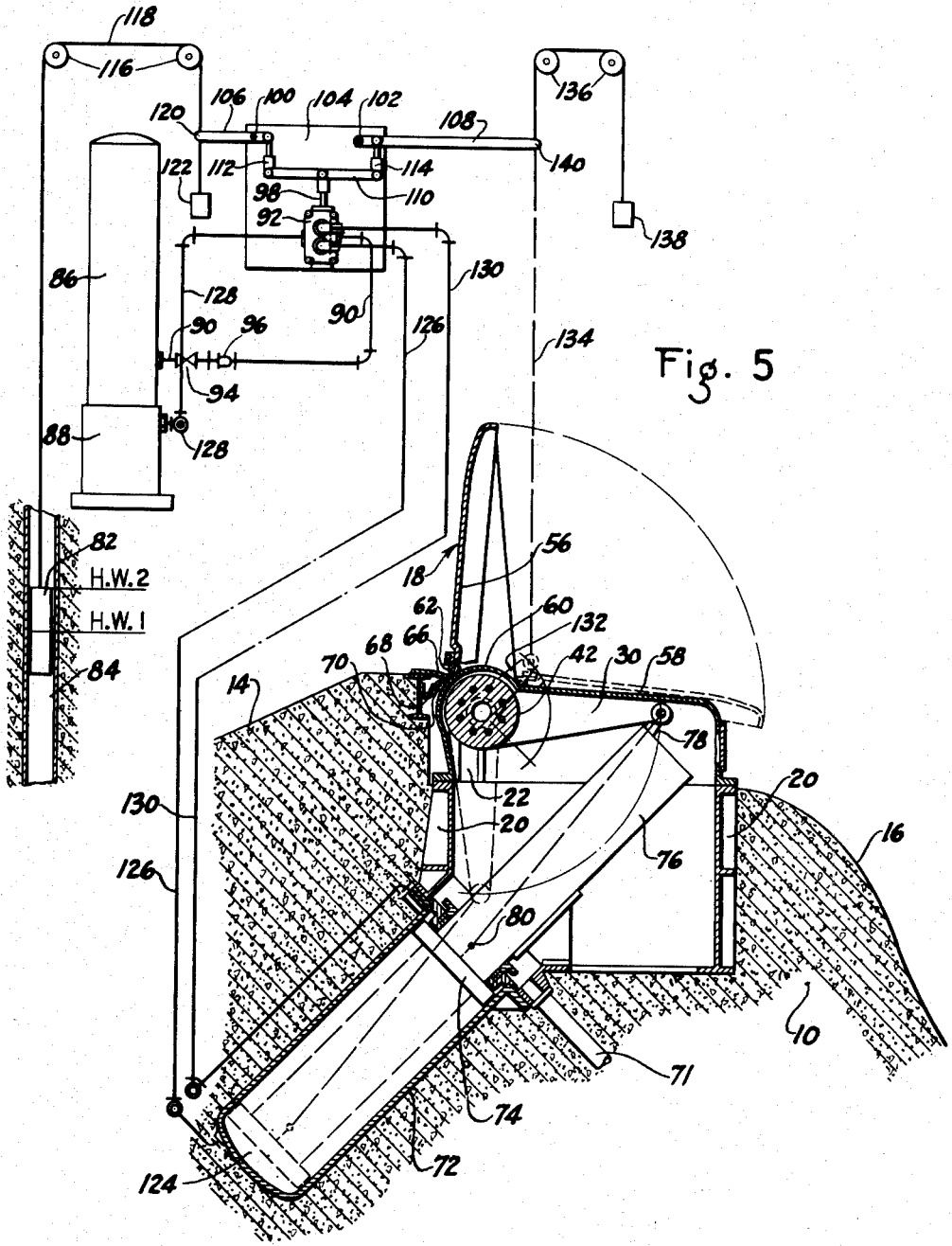
Fig. 5 is a view similar to Fig. 2 but showing in addition, in schematic fashion, float actuated means for operating the control valve for the power actuated member by which the position of the gate is varied to effect a desired headwater level, or maintained in an adjusted position.

Referring to the drawings, and particularly Fig. 1, a crest portion 10 of an exemplary dam is illustrated, said dam also including vertical ends or walls 12 in accordance with customary practice. Referring to Figs. 2 and 5, which are sectional views of the crest portion of the dam, a conventional up-stream face 14 and spillway face or apron 16 are illustrated. In the present illustration and description of the invention, it is assumed that a headwater control gate assembly is to be installed in a newly constructed dam, but it will be understood that the principles of the invention are, with only slight modification, applicable to control gates which may be installed on the crests of existing dams.

The present invention not only comprises a headwater control gate but also novel bearing means for pivotally supporting said gate as well as power actuated means associated with said bearing for moving the gate to and between its extreme positions. In Fig. 1, the gate is generally indicated 18 and, for purposes of ready description of the invention, said gate has been illustrated as composed of a plurality of preferably equal length sections respectively indicated A, B and C as clearly shown in Fig. 1. Due to the limitations of prescribed Patent Office drawings, these sections of the gate are actually illustrated in shorter lengths than is customary in practice. Usually, for a dam of the length actually illustrated in Fig. 1, only a single gate section need be used, whereas three such sections have been illustrated, each section being provided with a supporting main bearing and power actuated unit therefor.

As stated above, each section of the gate 18 is primarily supported and is also actuated by a preferably combined bearing and actuating unit such as illustrated in Figs. 2, 3 and 5. The required number of such units are installed in equally spaced positions across the crest portion of the dam 10 in accordance with the length thereof. Each unit comprises a compartment forming member or housing 20 which may be mounted for example, in situ, in the crest portion 10 when the dam is being constructed. A bearing frame 22 is affixed to the compartment forming member 20 by any suitable means such as bolts, not illustrated. Opposite side portions of the bearing frame 20 respectively are fixed to and support preferably bronze-lined cylindrical bearings 24 and 26. These bearings are axially aligned and the adjacent ends are spaced to accommodate the boss end 28 of a crank arm 30. The bearings 24 and 26 are preferably non-separable as illustrated especially in Fig. 4 which is a fragmentary sectional view thereof.

Supported by each bearing are cylindrical, torque shaft members 32 and 34, the inner ends of which abut opposite sides of the boss end 28 of the crank arm 30. The outer ends of the torque shaft members 32 and 34 preferably are formed with annular flanges 36. Tubular sections 38 and 40 of a composite torque member 42 are provided with centrally apertured discs 44 and 46 which are welded or otherwise fixed to said tubular sections. The discs 44 and 46, torque shaft members 32 and 34 and the boss end 28 of the crank arm are provided with radially spaced and axially aligned holes to receive bolts 48 by which all of the foregoing elements are secured fixedly to each other. Said assembled elements are all rotatably supported within the spaced bearings 24 and 26.

Inasmuch as the compartment forming means 20 is securely anchored to or within the crest portion 10 of the dam and the bearing frame 22 is fixed to said compartment member 20, the composite main bearing 24 and 26 which actually comprises a single interrupted bearing, is likewise fixed relative to the crest portion of the dam. Further, the axis of the composite main supporting bearing 24 and 26 is parallel to the crest of the dam and, if the length of the dam is such as to require more than one section of gate, the axes of all the composite main supporting bearings will be in axial alignment.

The gate 18 is sometimes referred to in the industry as a "Bascule" gate but is actually a cantilever type gate and is composed of a plurality of shield members 50 which are fixed at one edge to portions of the torque member 42 such as tubular sections 38 and 40. The edges of each shield member are provided with perpendicular flanges 52 to enable the sections to be fixedly secured together at their ends by bolts or rivets. Such an articulated gate provides a smooth, continuous up-stream surface 54 which extends between the opposite ends 12 of the dam. The gate 18, at each composite main bearing 24 and 26, also includes a shield member 56 which is provided at its ends with flanges 52 so that said ends may be fixedly connected to the ends of adjacent sections 50 of the gate but the edge of the shield member 56 adjacent the bearing is slightly spaced therefrom so that said shield member may move relative to the fixed bearing.

Each of the compartment forming members 20 is also provided with a cover 58 which, in the preferred and illustrated embodiment of the invention, extends above the upper edge of the member 20 and the cover 58 is also provided with a partially cylindrical or arcuate portion 60 that surrounds the boss end 28 of the crank arm 30 as shown in Figs. 2 and 3. The edges of the arcuate portion 60 preferably fit in annular recesses in the bearings 24 and 26 as shown in Fig. 3, whereby the outer surface of at least the upper portions of said bearings and the arcuate portion 60 of the cover comprise a continuous arcuate surface relative to which the inner edge of the shield member 56 moves about the axis of the bearing. Affixed to said inner edge of the shield member 56 is a resilient sealing member 62, which may be of any suitable composition such as relatively firm rubber. The sealing member 62 has wiping contact with the aforementioned upper surface portions of the bearings 25 and 26 and the arcuate portion 60 of the cover 58 so as to prevent any appreciable passage of water between said shield member and the bearings and cover. The ends of the bearings 24 and 26 adjacent the annular flanges 36 are also provided with annular recesses receiving yieldable sealing rings 63 which engage the annular flanges 36 during movement of the gate 18 to prevent the passage of water between said flanges and the bearings 24 and 26.

In the crest portion of the dam adjacent the up-stream face and extending from end to end thereof is fixed means comprising an I-beam 64, said beam being slightly spaced from the torque member 42 in an up-stream direction. A baffle plate 66 extends from the upper edge of the I-beam toward the torque member 42 and terminates in closely spaced relation thereto. Supported by the I-beam 64 is a resilient member 68 which may be of either steel or non-ferrous material and affixed to the edge of the resilient member 68 adjacent the torque member 42 is a resilient sealing strip 70 which is formed from material similar to the sealing member 62. Strip 70 provides wiping contact with the torque member 42 as the same is moved about the axis of the bearings 24 and 26.

In view of the foregoing, it will be seen that the sealing strip 70 prevents leakage of water between the up-stream crest portion of the dam and the torque member 42 except that adjacent each of the bearing units the member 68 and strip 70 are interrupted and the sealing member 62 on shield member 56 prevents the passage of water between the gate in the area of the bearing units 24 and 26. By this arrangement, no appreciable amount of water can pass under the gate 18 and effective damming of the headwater is afforded, whereby discharge of the headwater can take place only over the outer or upper edge of the gate 18 and flow onto the spillway apron 16. The cover 58 shields the contents of compartment 20 from contact by water spilling over the gate 18. Should any slight leakage or seepage occur into compartment 20 however, a drain 71 is provided to extend from the lower portion of said compartment, as shown in Fig. 5, to a lower level on apron 16.

Headwater controlling gates of this nature are not uncommonly one or more hundreds of feet in length. As stated hereinabove, the required number of connected sections A, B and C of gate 18 are employed to span the entire length of the dam. The distance between the main composite bearing units 24 and 26 is usually much greater than that illustrated in Fig. 1, there being only one composite main bearing for each section of gate and each gate section A, B or C extends substantially equally in opposite lateral directions from each composite main bearing.

For example, regarding a dam about 50 feet long, only one gate section is required having one composite main bearing 24 and 26 therefor in the center of the crest portion of the dam. The gate 18 will extend equally and laterally in opposite directions therefrom to engage the ends 12 of the dam. In a gate this long, as well as in even shorter gates, it will readily be understood that the pressure of the headwater will impose stresses particularly upon the intermediate portions and ends of the gate. It is therefore desirable under these circumstances to employ supplemental bearings, not illustrated, which are fixed relative to the crest portion of the dam and are spaced along the torque member 42 so as to engage at least the under and down-stream surfaces of the torque member, mainly to steady the torque member and gate and prevent bending thereof. These supplemental bearings may, for example, be of the open or saddle shaped type as shown especially in Fig. 2 of the aforementioned Patent No. 2,192,510. The torque member 42 is merely seated within but is not enclosed by them. This arrangement provides adequate support of the intermediate portions and ends of the gate to resist stresses imposed upon the gate and torque member, yet obviously simplifies the construction of the torque member and gate.

As distinguished from the gate operating means used heretofore which were mounted considerably above the headwater level and within piers rising vertically from the crest of the dam at the ends thereof as well as at intermediate positions between the ends thereof, the present invention provides power actuated means which are all mounted below the head water level within the crest portion of the dam, whereby a continuous uninterrupted and unobstructed gate may extend entirely across a dam from end to end, thereby permitting the maximum passage of water over the gate without being obstructed by intermediate piers and also enhancing the esthetic appearance of the dam and gate. Further, freer discharge of debris and ice is afforded by the elimination of piers up-standing from the crest of the dam between the ends thereof as in present practice. The positioning of power actuated units or means within the crest portion of the dam and below the headwater level also permits less expensive installation of the gate supporting and power actuating means since no piers and less main bearings and actuating mechanisms are required, there being only one main bearing and actuating unit for each gate section in accordance with the invention.

The preferred embodiment of the power actuated means is illustrated in Figs. 2, 3 and 5. Said means comprises a hydraulic cylinder 72 which is illustrated herein as being mounted, in situ, within the crest portion of the dam. However, it is to be understood that a separate housing for said cylinder may be mounted within the dam and suitable means provided for removably fixing the cylinder 72 within said housing, all within the spirit of the present invention. It is also preferred that the cylinder 72 be fixed relative to and, in effect, comprises a preferably watertight continuation of the compartment 20 as clearly illustrated in the drawings. Reciprocably mounted within the cylinder 72 is a hollow piston 74 having a concentric sleeve 76 which extends into the compartment 20.

Pivotally connected at one end to the piston 74 is a connecting rod 78, said rod being within the piston sleeve 76 and the axis of the connection being indicated 80. The other end of the connecting rod is connected to the outer end of the crank arm 38, whereby reciprocation of the piston 74 will effect rotation of the gate 18 about the axis of the composite bearings 24 and 26. It will be seen that this arrangement affords shielding of the means interconnecting the gate with the power actuated means from contact by water discharging over the gate inasmuch as all of said interconnecting mechanism is enclosed by cover 58 within the compartment 20.

In situations requiring more than one section of gate and corresponding main bearing and power actuated units therefor, the power actuated units or means for all the interconnected gate sections may all be supplied with fluid under pressure from a common source and controlled by valve arrangements positioned, for example in a house or compartment at one end of the dam, whereby all of the gate sections either will be moved simultaneously in unison or maintained in a desired stationary position, thereby minimizing torque stresses in the torque member 42 as well as bending of the gate 18.

The gate 18 is arranged to be held in or moved from one desired position to another depending upon various conditions of the head water. For example, particularly during flood periods, the normal level of the stream will be such that the gate 18 should be moved to some desired intermediate position or possibly to the full discharge position illustrated in dotted lines in Figs. 2 and 5. Such movement of the gate is controllable by the level of the headwater through the medium of a float 82 preferably positioned in a well 84 directly communicating with the headwater so that the float will be responsive to the level thereof.

Float 82 is illustrated schematically in Fig. 5. In this figure, adjacent the well 84, there is also illustrated two exemplary headwater levels relative to and between which the float will move to control valve mechanism to be described. For example, as the headwater approaches the higher level indicated HW2, the gate 18 will be lowered to accelerate the discharge of water over the gate until the headwater is decreased substantially to the level indicated HW1. As the float moves toward the lower level, the gate will be raised to increase the headwater level. Thus, the headwater level will automatically be maintained somewhere between the two indicated levels but usually near the upper one.

Reference is now made to Fig. 5 wherein the valve mechanism controlling the operation of the gate and the fluid pressure means is illustrated. Hydraulic fluid of any suitable sort such as oil is pumped by means, not shown, into a pressure tank 86 and maintained under pressure therein within desired limits. Mounted for convenience below the pressure tank is a sump tank 88, there being no direct communication between the two tanks. Fluid under pressure is constantly available from pressure tank 86 through conduit 90 which communicates with the inlet of a four-way control valve 92. One or more regulating valves 94 as well as a check valve 96 preferably are mounted within the conduit 90 between tank 86 and control valve 92.

As will be seen diagrammatically from Figs. 7 through 10, the control valve 92 has a reciprocating valve member 98 which extends above one end of the casing of control valve 92. A plurality of pivots 100 and 102 are mounted in fixed relation to the control valve 92 as, for example, on a supporting plate 104. The pivot 100 rotatably supports a lever 106 intermediately of the ends thereof and pivot 102 rotatably supports one end of another lever 108. A floating bar 110 is pivotally connected intermediately of its ends to the upper end of valve member 98 and the ends of bar 110 are respectively pivotally connected by adjustable links 112 and 114 to one end of lever 106 and to lever 108 intermediately of the ends thereof.

Pulleys 116 support a flexible cable 118, by which the float 82 is connected to the other end 120 of lever 106. A counterweight 122 depends from the end of the cable fastened to end 120 of lever 106. Thus, as the float 82 rises within the well 84, the end 120 of lever 106 will be lowered and the opposite end thereof will be elevated to correspondingly raise the valve member 98 to the position shown in Fig. 8 and permit fluid to drain from the pressure or lower end 124 of cylinder 72 and through conduit 126 to and through valve 92, and from there through conduit 128 to the sump tank 88. Under these circumstances, the fluid pressure conduit 90 will be connected through valve 92 to conduit 130 which communicates with the upper end of cylinder 72. Fluid under pressure thereby engages the upper face of piston 170 and hastens the lowering of gate 118.

Fixedly connected to the torque member 42 is any suitable means such as an arm 132, the outer end of which is connected to one end of a flexible cable 134. The arm 132 may for convenience be secured to an extension at one end of torque member 42, as shown in Fig. 1, and be accommodated with cable 132 in a recess in one end 12 of the dam. Said cable extends over pulleys 136 and the other end of cable 134 is connected to a counterweight 138 suspended therefrom. The cable 134 is likewise connected to the end 140 of lever 108 which is opposite the pivot 102. Thus, as the gate 18 is lowered from an elevated position, the outer end of arm 132 will be lowered and, by means of cable 134, will lower the end 140 of lever 108. Correspondingly, the end of floating bar 110 which is connected to link 114 will also be lowered and thereby gradually counteract the elevation of valve member 98 which was caused by the raising of float 82 as described above. Consequently, the valve member 98 is gradually moved to its neutral position illustrated in Fig. 7 so as to decelerate and arrest the lowering of the gate 18.

Figure 9:
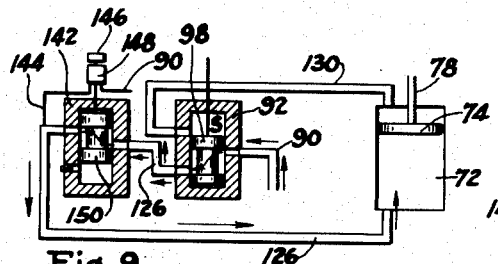

The aforementioned lowering of the gate will cause the headwater level to decrease more rapidly than if the gate remained in its uppermost damming position, for example, and when the headwater discharges sufficiently that the float 82 is lowered to the vicinity of the level indicated HW1, such lowering of the float will raise end 120 of lever 106 and depress the other end thereof so as to lower valve member 98 to the position thereof shown in Fig. 9 and thereby effect raising of the gate so as gradually to cause the headwater level to rise toward the level HW2. Raising of the gate is caused by pressure in conduit 90 passing through valve 92 into conduit 126 as indicated by the arrows in Fig. 9. Fluid under pressure is therefore forced into the pressure end 124 of cylinder 72 and against the pressure face of the piston so as to rotate the gate counterclockwise as viewed in Figs. 2 and 5. Fluid is forced from the upper end of cylinder 72, through conduit 130 and the sump port S of valve 92, to sump tank 88. Elevation of the gate is checked, however, by the outer end of arm 132 being raised so as likewise to raise the end of floating bar 110 connected to link 144 and correspondingly counteract the lowering of valve member 98 caused by the lowering of float 82 toward level HW1. Checking or deceleration of the raising of the gate as aforesaid continues until the valve 98 reaches its neutral position illustrated in Fig. 7.

Figure 6:
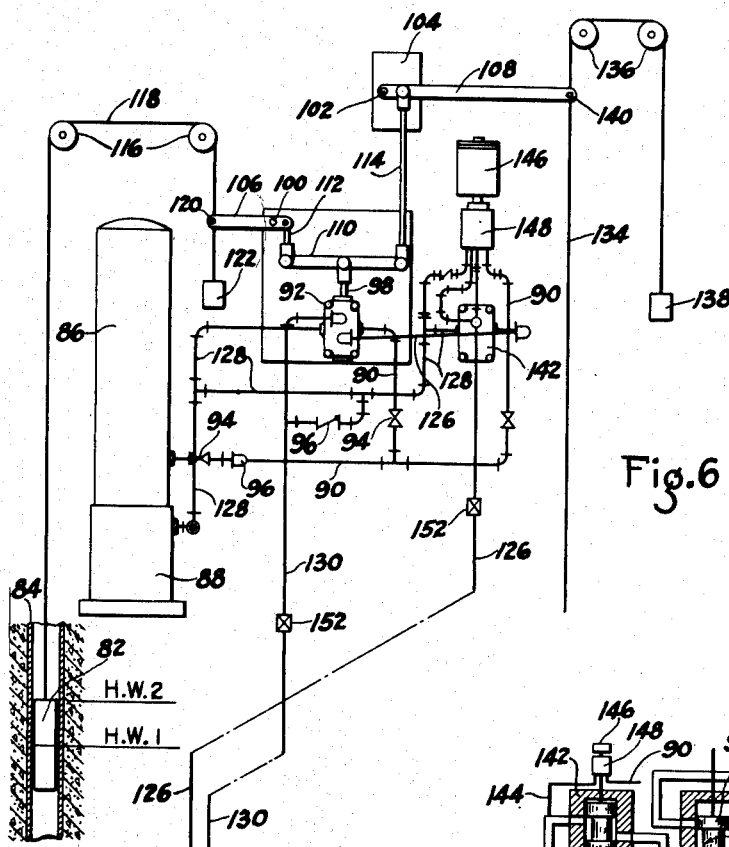
Fig. 6 is a partially schematic layout of control means for the hydraulically actuated mechanism shown in Figs. 1 through 3 and 5, said control means showing, in addition to that shown in Fig. 5 valve mechanism arranged to be operated by a load against the gate.

As has been set forth above, the control mechanism illustrated in Fig. 5 relates to operation of the gate as a result of variations in the level of the head water per se. Gates of the nature described herein are also subject to abnormal loads such as the accumulation of ice or excessive amounts of debris against the gate. Such load against the gate is also accented by wind blowing generally in the direction of the flow of the stream. Unless such excessive load or pressure is relieved by lowering of the gate, for example, damage may be sustained by the gate or its supporting and actuating mechanism. Control mechanism for causing lowering of the gate under such excess load conditions, regardless of headwater level, is illustrated schematically in Fig. 6. The essential difference between the control arrangement shown in Fig. 6 over Fig. 5 is the inclusion of an unloader valve 142 in Fig. 6. When the gate 18 is being controlled solely by headwater level which affects valve 92 only, in accordance with the arrangement shown in Fig. 5, the unloader valve 142 is maintained automatically in open position as illustrated in Figs. 7 through 9, the unloader valve 142 being mounted within the conduit 126 between the lower end of cylinder 72 and valve 92.

When the gate 18 is subjected to abnormal loads caused by ice jams and the like as described above, the gate will be in fully or partially elevated damming position and held there by hydraulic pressure within the line 126 being imposed upon the pressure face of the piston 74. For example, a floating mass of ice, upon contacting the gate or hitting a mass of ice already accumulated against the gate will impose a surge of load force or pressure against the gate and said surge will result in the piston 74 transmitting said surge in force to the pressure in line 126, thereby increasing the pressure therein. Unloader valve member 150 will at this time be positioned as shown in Figs. 7 through 9. The increase in pressure in line 126 will be carried by a py-pass conduit 144 so as to be applied against a vertically reciprocable and gravity actuated weight 146 that surmounts and cooperates with a servo-motor 148. The servo-motor 148 is connected to the upper end of valve member 150 of unloader valve 142 as is clearly shown in Figs. 6 through 10. Normally the weight 146 is sufficiently heavy that it will withstand the normal operating pressure in conduit 126 and the weight 146 will only be raised when pressure against the gate 18 exceeds the normal operating pressure in line 126.

Figure 7:
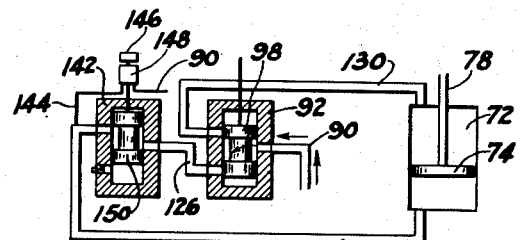
Figs. 7, 8 and 9 are schematic views respectively showing the float control valve means of Fig. 5 in neutral, gate lowering, the gate raising positions.
Figure 8:
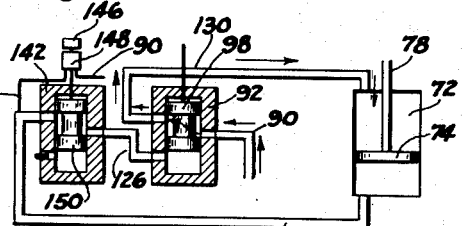
Figure 10:
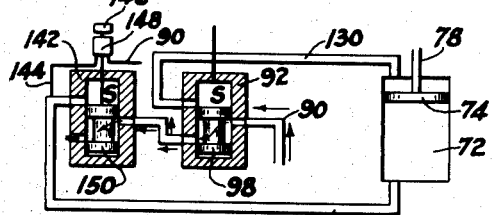
Fig. 10 is a schematic view similar to Figs. 7 through 9 but additionally showing the position of a pressure actuated valve responsive to a load against the gate.

Upon the raising of the weight 146 by excessive pressures by-passed thereto by conduit 144, a trip type switch, not shown, which controls the hydraulically actuated servo-motor 148 will cause the motor to operate and lower the unloader valve member 150 from its position shown in Figs. 7 through 9 to its position shown in Fig. 10. Hydraulically operated servo-motor 148 is actuated by pressure from conduit 90.

Lowering of the unloader valve member 150 connects the pressure conduit 126, which has been holding the gate 18 elevated, to the sump tank. Sump tank conduit 128 is connected to unloader valve 142 to achieve this as can be seen from Fig. 6. Under this condition, the excessive pressure against the gate 18 will quickly bleed pressure fluid from the bottom of the cylinders 72 through conduit 126 and control valve 92 to conduit 128 and the sump tank 88. This will cause a rapid lowering of the gate 18 so as to relieve the load thereagainst. If such load is caused by ice or a heavy accumulation of debris, the latter will pass quickly over the gate and spillway apron and no damage will be sustained by the gate or its supporting and operating mechanism.

The lowering of the gate 18 under these circumstances will result in the end 140 of lever 108 being lowered by cable 134 which causes a resulting lowering of valve member 98 so as to set valve 92 to pass pressure from conduit 90 to unloader valve 142 as illustrated in Fig. 10. However, the pressure from conduit 90 will be trapped within unloader valve 142 when the valve member 150 is disposed as shown in Fig. 10. Therefore, no raising of gate 18 can take place. This arrangement is purposely made so that unloader valve 142 can be restored to the position shown in Figs. 7 through 9 only by manual operation. Meanwhile, an opportunity is afforded for inspection of the gate and its supporting and actuating mechanism to determine whether any damage has been caused.

When restoration of the gate is desired to an elevated or damming position following such above described lowering thereof, the unloader valve 142 is manually operated by pressing downward on the weight 146 to restore the trip type switch of the servo-motor 148 to holding position and also cause the servo-motor 148 to raise the valve member 150 of the unloader valve 142 to the normal position thereof shown in Figs. 7 through 9. Upon this occurring, the gate 18 will automatically be raised to the position thereof required by the level of the float 82 which controls the operation of valve 92 as above described since valves 92 and 142 will then be conditioned as shown in Fig. 9.

In dams of appreciable length which require a plurality of connected gate sections such as A, B and C and associated supporting and power actuated units, all of the cylinders 72 of the power actuated units may be connected by suitable extensions of conduits 126 and 130 to a single pressure tank 86 and a single sump tank 88. To overcome variations in pressure to the respective cylinders 72 due to friction and other losses and provide substantially equal pressures to the respective cylinders 72, an adjustable throttling valve 152 is provided in each of the lines 126 and 130 to the cylinders 72. Such arrangement will permit operation of all of the gate sections, such as A, B and C in unison so as effectively to prevent any tendency to twist the gate or torque member by operation of the power actuated means.

As has been stated in the foregoing, the gate 18, regardless of whether it comprises a single or a number of sections interconnected to form the same, comprises a continuous and uninterrupted gate spanning the entire crest of the dam 10 between the end walls 12 thereof. In order to prevent any substantial leakage of headwater between the ends of the gate 18 and the vertical surfaces of the end walls 12, said end walls are preferably respectively provided with suitable plates 154 and the ends of the gate have perpendicular flanges 156 to which flexible sealing strips 158 are attached. These sealing strips have wiping contact with plates 154 and, for practical purposes, said strips may be similar in design and composition to strips or members 62 and 70 which coact with the cover 58 and torque member 42.

From the foregoing, it will be seen that the present invention provides a continuous and uninterrupted gate attachable to the crest portion of a dam and extending across the entire length of the dam for purposes of controlling the headwater level of said dam and automatically operable means are provided for controlling the position of the gate in accordance either with headwater level or load pressure against said gate such as might be occasioned by ice jams or unusual accumulations of debris. The gate is supported by simple main bearing structures which are readily installed and power actuated means are associated with each main bearing for actuating a section of gate supported by said main bearing. The gate section supported by each main bearing extends equally and laterally in opposite direction from the bearing so as to provide maximum economy in use of the bearing and reduce the number of main bearings and actuating units required as compared to those required in prior art devices of this nature.

Further, the power actuated means for the gate preferably are disposed within the crest portion of the dam below the headwater level so as to permit the use of a continuous and unobstructed gate from end to end of the dam. Thus, the efficiency of the gate and dam is greatly increased over those heretofore used, which required intermediate piers, inasmuch as a continuous and unobstructed gate will permit the passage of the greatest possible amount of water thereover during a given period. In addition, the esthetic appearance of the dam and the gate are improved as compared with those heretofore used wherein intermediate piers were required. Substantial economies in construction and installation are also effected by the invention requiring fewer power actuated mechanisms and main bearings than were heretofore needed in installations of this nature wherein a power actuated member was required at each end of each gate section extending between either the end or intermediate piers.

While the invention has been shown and illustrated in its several preferred embodiments, and has included certain details, it should be understood that the invention is not to be limited to the precise details herein illustrated and described since the same may be carried out in other ways falling within the scope of the invention as claimed.

I claim:

1. A headwater control gate assembly constructed and arranged to be attached to the crest portion of a dam and comprising in combination, a gate comprising a torque member and a shield attached at one edge thereto and constructed and arranged to be mounted for pivotal movement relative to the crest of said dam and about the axis of said torque member between a substantially vertical and a substantially horizontal position, power actuated means arranged to be positioned below the crest of said dam, and means interconnecting said torque member and power actuated means, whereby said power actuated means is operable to move said gate as aforesaid to control the level of the headwater.

2. A headwater control gate assembly constructed and arranged to be attached to the crest portion of a dam and comprising in combination, a bearing fixably mountable on said crest portion of said dam and axially parallel thereto, a gate comprising a torque member supported by said bearing and a shield attached at one edge to said torque member and radially movable by said torque member about the axis thereof between a substantially vertical position and a substantially horizontal position relative to the crest of said dam, a crank arm connected at one end to said torque member, power actuated means arranged to be positioned below the headwater level, and means interconnecting the other end of said crank arm and power actuated means, whereby said power actuated means is operable to move said gate to and between said positions thereof to control the level of the headwater.

3. A headwater control gate assembly constructed and arranged to be attached to the crest portion of a dam and comprising in combination, a bearing fixably mountable on said crest portion of said dam between the ends thereof and axially parallel to said crest portion, a gate comprising a torque member supported by said bearing and extending laterally in opposite directions therefrom, said gate also comprising a shield attached at one edge to said torque member and radially movable therewith about the axis of said bearing between a substantially vertical damming position and a substantially horizontal discharge position relative to the crest of said dam, power actuated means arranged to be positioned in the dam below the headwater level, and means interconnecting said torque member and power actuated means, whereby said power actuated means is operable to move said gate as aforesaid to control the level of the headwater.

4. A headwater control gate assembly constructed and arranged to be attached to the crest portion of a dam and comprising in combination, compartment forming means constructed and arranged to be mounted within the crest portion of said dam, a bearing fixably mountable relative to said compartment and axially parallel to the crest of said dam, a gate comprising a torque member and a shield attached at one edge thereto so as to extend radially therefrom, said torque member being supported by said bearing and radially movable about the axis thereof between a substantially vertical and a substantially horizontal position relative to the crest of said dam, power actuated means arranged to be positioned within the crest portion of said dam below the headwater level and adjacent said compartment forming means, and means enclosed by said compartment forming means and interconnecting said torque member and power actuated means, whereby said power actuated means is operable to move said gate as aforesaid to control the level of the headwater.

5. A headwater control gate assembly constructed and arranged to be attached to the crest portion of a dam and comprising in combination, compartment forming means constructed and arranged to be mounted within the crest portion of said dam and having an opening therein, a bearing fixably mountable relative to the upper portion of said compartment for support thereby and axially parallel to the crest of said dam, a gate comprising a torque member and a shield attached at one edge thereto, said torque member being supported by said bearing and radially movable about the axis thereof to position said shield between a substantially vertical and a substantially horizontal position relative to the crest of said dam, power actuated means arranged to be positioned within the crest portion of said dam below the crest thereof and intercommunicating with said compartment forming means, means within said compartment forming means and interconnecting said torque member and power actuated means, whereby said power actuated means is operable to move said gate as aforesaid to control the level of the headwater, and a cover detachably connected to said compartment forming means and cooperating therewith to enclose said interconnecting means and shield the same from contact by water discharged over said gate.

6. A gate assembly pivotally mountable relative to the crest portion of a dam for maintaining the headwater at a predetermined level and comprising in combination, supporting means attachable to the crest portion of said dam and including a bearing positionable with its axis substantially parallel to said crest, a cantilever gate member comprising a shield attached at one edge to a torque member, said torque member being pivotally supported intermediately of its ends by said bearing and said shield being pivotally movable therewith about the axis of said bearing between a substantially vertical and a substantially horizontal position, a crank arm connected at one end to said torque member, and power actuated means mountable adjacent said bearing below the crest of said dam, said power actuated means being interconnected to the other end of said crank arm and operable to actuate said gate in opposite directions about the axis of said bearing.

7. A gate assembly attachable to the crest portion of a dam for pivotal movement about an axis fixed and parallel to said crest portion, said gate assembly comprising in combination, a combined gate actuating and supporting means attachable to the crest portion of said dam and including a bearing having its axis substantially parallel to said crest and power means arranged to be mounted within the crest portion of said dam below the head-water level, a cantilever type gate comprising a shield member fixed at one edge to a torque member pivotally supported by said bearing for movement of said shield about the axis of said bearing in opposite directions between substantially vertical and horizontal positions, said shield extending substantially equally and laterally an appreciable distance in opposite directions from the center of said bearing, a crank arm connected at one end to said torque member, and means interconnecting said power means to the other end of said crank arm and operable to actuate said gate as aforesaid to control the head-water level.

8. A gate assembly attachable to the crest portion of a dam for pivotal movement about an axis fixed and parallel to said crest portion, said gate assembly comprising in combination, a combined gate actuating and supporting means attachable to the crest portion of said dam and including a bearing having its axis substantially parallel to said crest and power means arranged to be mounted within the crest portion of said dam below the head-water level, a cantilever type gate comprising articulated sections of a shield member fixed respectively at one edge to articulated sections of a torque member pivotally supported by said bearing for movement of said shield about the axis of said bearing in opposite directions between substantially vertical and horizontal positions, said articulated shield and torque member extending substantially equally and laterally in opposite directions from the center of said bearing, and means interconnecting said power means to said gate and operable to actuate said gate as aforesaid to control the headwater level.

9. A gate assembly constructed and arranged to be attached to the crest portion of a dam, said gate assembly comprising in combination, gate supporting means fixedly attachable to the crest portion of said dam and including a bearing having its axis fixed and substantially parallel relative to said crest, power actuated means arranged to be mounted within said dam below the crest thereof, a cantilever type gate comprising a shield member fixed at one edge to a torque member pivotally supported by said bearing for movement of said shield about the axis of said bearing in opposite directions between a substantially vertical and a substantially horizontal position, said shield extending substantially equally and laterally in opposite directions from the center of said bearing and said torque means comprising a solid section mounted within said bearing and tubular sections connected to said solid section and extending laterally in opposite directions therefrom and said bearing, and means interconnecting said power actuated means to said gate, whereby said power actuated means is operable to actuate said gate as aforesaid to control the headwater level.

10. A gate assembly constructed and arranged to be attachable to the crest portion of a dam, said gate assembly comprising in combination, gate supporting means fixedly attachable to the crest portion of said dam and including a bearing having its axis fixed and substantially parallel relative to said crest, power actuated means arranged to be mounted adjacent said bearing, a cantilever type gate comprising a shield member fixed at one edge to a torque member pivotally supported by said bearing for movement of said shield about the axis of said bearing in opposite directions between a substantially vertical and a substantially horizontal position, said shield extending substantially equally and laterally in opposite directions from the center of said bearing and said bearing being interrupted intermediately of the ends thereof, a crank arm received within said interrupted portion of said bearing and connected at one end to said torque member, and means connecting the other end of said crank arm to said power actuated means, whereby to permit said gate to be actuated by said power actuated means to and between said aforementioned positions thereof to control the level of the headwater.

11. A gate assembly attachable to the crest portion of a dam, said gate assembly comprising in combination, a combined gate actuating and supporting unit fixedly attachable to the crest portion of said dam and including a bearing having its axis substantially parallel to said crest and power actuated means comprising a piston reciprocable within a hydraulic cylinder positioned adjacent said bearing and arranged to be fixed to the crest portion of said dam below the headwater level, a cantilever type gate comprising a shield member fixed at one edge to a torque member pivotally supported by said bearing for movement of said shield about the axis of said bearing in opposite directions between a substantially vertical and a substantially horizontal position, said shield extending substantially equally and laterally in opposite directions from the center of said bearing, a crank arm connected at one end to said torque member, and a connecting rod interconnecting said piston to the opposite end of said crank arm, whereby said piston is operable to move said gate to and between said aforementioned positions thereof to control the head level of water behind said dam.

12. A gate assembly constructed and arranged to be attached to the crest portion of a dam, said gate assembly comprising in combination, a substantially evenly spaced plurality of combined gate actuating and supporting units attachable to the crest portion of said dam and each unit including a bearing axially aligned with the bearings of the other units and in parallelism to said crest and each unit also including power actuated means comprising a piston reciprocable within a hydraulic cylinder positioned adjacent said bearing and arranged to be fixed to the crest portion of said dam, a cantilever type gate comprising a plurality of articulated sections each comprising a shield member fixed at one edge to a torque member, the torque member of each section being pivotally supported by the bearing of one of said actuating and supporting units for movement of said unit about the axis of said bearing in opposite directions between a substantially vertical and a substantially horizontal position, the shield and torque member of each section extending substantially equally and laterally in opposite directions from the center of the bearing for each unit, and means respectively interconnecting the piston of each unit to each section of said gate, whereby the entire gate is operable by said pistons for movement to and between the aforementioned positions thereof to control the headwater level.

13. The structure set forth in Claim 12 further including wiping sealing means at opposite ends of said gate engageable with end walls rising from opposite ends of said dam.

14. A gate assembly arranged to be attached to the crest portion of a dam for maintaining the head water at a predetermined level and comprising in combination, compartment forming means fixably mountable relative to said crest portion, a bearing associated with said compartment means, a gate extending laterally in opposite directions from said bearing and comprising torque means pivotally supported thereby and a shield member fixed at one edge to said torque member for movement about the axis of said bearing between a substantially vertical and a substantially horizontal position relative to the crest of said dam, power actuated means associated with said compartment means and arranged to be mounted below the headwater lever, a crank arm fixed at one end to said torque means, mechanism within said compartment interconnecting the other end of said crank and power actuated means, cover means detachably connected to said compartment forming means and arranged to enclose said bearing and crank arm and otherwise render the contents of said compartment substantially water-tight, said gate being movable relative to said cover means, and water sealing means extending between said cover and gate.

15. A gate assembly arranged to be attached to the crest portion of a dam for maintaining the headwater at a predetermined level and comprising in combination, compartment forming means fixably attachable relative to said crest portion, a bearing associated with the upper portion of said compartment means and axially parallel to the crest of said dam, gate mechanism pivotally supported by said bearing and comprising a cylindrical torque member and a shield attached thereto at one edge, said gate extending laterally in opposite directions from said bearing and the torque member thereof extending through said bearing to be supported thereby for movement of said gate about the axis of said bearing between a substantially vertical and a substantially horizontal position, power actuated means associated with said compartment means below said bearing, mechanism within said compartment interconnecting said gate mechanism and power actuated means, cover means attached to said compartment forming means and arranged to render the therewithin bearing and interconnecting mechanism substantially water-tight, said shield of said gate mechanism being movable relative to said cover means and provided with sealing means between said gate and said shield, means fixed to the crest of said dam and extending in slightly spaced parallel relationship to the torque member extending laterally from said bearing, and sealing means supported by said fixed means and having wiping engagement with said torque member substantially to prevent the passage of water therebetween.

16. A crest water control gate assembly constructed and arranged to be attached to the crest portion of a dam and comprising in combination, a gate adapted to be mounted for pivotal movement between a substantially vertical full damming position and a substantially horizontal full discharge position relative to the crest of said dam, power actuated means comprising a hydraulic cylinder and reciprocable piston therein arranged to be positioned below the crest of said dam, means interconnecting said gate and piston, whereby said piston is operable to move said gate as aforesaid to control the headwater at a predetermined level, a control valve arranged to receive fluid under pressure and connected to said cylinder to actuate said piston and selectively maintain said gate in a predetermined position relative to said dam, and valve actuating means operable by an increase in load upon said gate to move said valve to a position to relieve the fluid pressure upon said piston and thereby permit said gate to move in discharge direction.

17. A crest water control gate assembly constructed and arranged to be attached to the crest portion of a dam and comprising in combination, a gate adapted to be mounted for pivotal movement between a substantially vertical full damming position and a substantially horizontal full discharge position relative to the crest of said dam, power actuated means comprising a hydraulic cylinder and piston reciprocable therein arranged to be positioned below the crest of said dam, means interconnecting said gate and piston, whereby said piston is operable to move said gate as aforesaid to control the headwater at a predetermined level, a control valve arranged to receive fluid under pressure and connected to said cylinder to actuate said piston and move said gate as aforesaid and also selectively maintain it in a predetermined position at or between said aforementioned positions relative to said dam, a float mounted for movement responsively to the level of the headwater, and valve actuating means operable in accordance with the level of said float to move said valve to cause the position of said gate to be varied.

18. A crest water control gate assembly constructed and arranged to be attached to the crest portion of a dam and comprising in combination, a gate adapted to be mounted for pivotal movement between a substantially vertical full damming position and a substantially horizontal full discharge position relative to the crest of said dam, power actuated means comprising a hydraulic cylinder and reciprocable piston therein arranged to be positioned below the crest of said dam, means interconnecting said gate and piston, whereby said piston is operable to move said gate as aforesaid to control the headwater at a predetermined level, a control valve arranged to receive fluid under pressure and connected to said cylinder to actuate said piston and selectively maintain said gate in a predetermined position relative to said dam, valve actuating means operable by an increase in load upon said gate to move said valve to a position to relieve the fluid pressure upon said piston and thereby permit said gate to move in discharge direction, and a float mounted for movement responsively to the level of the headwater and interconnected to said valve, said valve being operable in accordance with the level of said float to actuate said valve and cause movement of said piston to vary the position of said gate in response to the level of the headwater.

19. A gate assembly attachable to the crest portion of a dam for pivotal movement about an axis fixed relative to and parallel to said crest portion, said gate assembly comprising in combination; a bearing structure comprising two spaced and axially aligned bearing members arranged to be fixed to said crest portion in substantially axially parallel relation to said crest; an articulated torque means comprising a pair of axially aligned shaft members respectively rotatably mounted within said bearing members, a crank arm having one end disposed between said bearing members and connected to one end of each of said shaft members, torque members respectively connected to and extending axially from the opposite ends of said shaft members; and a shield connected at one edge to said torque members and also extending across said shaft members and crank arm to comprise a cantilever type gate operable by said crank arm for movement of said shield about the axis of said bearing structure in opposite directions between a substantially vertical and a substantially horizontal position relative to the crest of said dam to vary the headwater level.

References Cited in the file of this patent

UNITED STATES PATENTS

| Number | Name | Date |
|---|---|---|
| 647,543 | Venable | Apr. 17, 1900 |
| 1,084,454 | Liljegran | Jan. 13, 1914 |
| 2,335,327 | Wellons | Nov. 30, 1943 |
| 2,551,678 | Jumar | May 8, 1951 |

FOREIGN PATENTS

| Number | Country | Date |
|---|---|---|
| 607,468 | France | of 1926 |